US011872591B2

(12) United States Patent
Adorno et al.

(10) Patent No.: US 11,872,591 B2
(45) Date of Patent: Jan. 16, 2024

(54) MICRO-MACHINED ULTRASONIC TRANSDUCER INCLUDING A TUNABLE HELMOLTZ RESONATOR

(71) Applicant: STMICROELECTRONICS S.r.l., Agrate Brianza (IT)

(72) Inventors: Silvia Adorno, Novate Milanese (IT); Roberto Carminati, Piancogno (IT)

(73) Assignee: STMICROELECTRONICS S.r.l., Agrate Brianza (IT)

( * ) Notice: Subject to any disclaimer, the term of this patent is extended or adjusted under 35 U.S.C. 154(b) by 617 days.

(21) Appl. No.: 17/118,443

(22) Filed: Dec. 10, 2020

(65) Prior Publication Data

US 2021/0178430 A1 Jun. 17, 2021

(30) Foreign Application Priority Data

Dec. 13, 2019 (IT) ........................ 102019000023943

(51) Int. Cl.
*B06B 1/06* (2006.01)
*B06B 1/02* (2006.01)
*G10K 9/122* (2006.01)

(52) U.S. Cl.
CPC .............. *B06B 1/0292* (2013.01); *B06B 1/06* (2013.01); *B06B 1/0666* (2013.01); *G10K 9/122* (2013.01)

(58) Field of Classification Search
CPC ........ B06B 1/06; B06B 1/0666; B06B 1/0292
USPC ......................................... 310/309, 322, 334
See application file for complete search history.

(56) References Cited

U.S. PATENT DOCUMENTS 4,042,845 A 8/1977 Hackett
2005/0162040 A1* 7/2005 Robert .................. H03H 9/173 310/322
2006/0022555 A1* 2/2006 Balasubramaniam ...................... B60C 23/0411 310/339
2007/0164632 A1 7/2007 Adachi et al.
2015/0357375 A1 12/2015 Tsai et al.
(Continued)

FOREIGN PATENT DOCUMENTS

CN 1143184 A 2/1997
CN 103703794 A 4/2014
(Continued)

*Primary Examiner* — Derek J Rosenau
(74) *Attorney, Agent, or Firm* — Seed IP Law Group LLP

(57) ABSTRACT

A micro-machined ultrasonic transducer is proposed. The micro-machined ultrasonic transducer includes a membrane element for transmitting/receiving ultrasonic waves, during the transmission/reception of ultrasonic waves the membrane element oscillating, about an equilibrium position, at a respective resonance frequency. The equilibrium position of the membrane element is variable according to a biasing electric signal applied to the membrane element. The micro-machined ultrasonic transducer further comprises a cap structure extending above the membrane element; the cap structure identifies, between it and the membrane element, a cavity whose volume is variable according to the equilibrium position of the membrane element. The cap structure comprises an opening for inputting/outputting the ultrasonic waves into/from the cavity. The cap structure and the membrane element act as tunable Helmholtz resonator, whereby the resonance frequency is variable according to the volume of the cavity.

20 Claims, 3 Drawing Sheets

(56) References Cited

U.S. PATENT DOCUMENTS

| | | | |
|---|---|---|---|
| 2017/0184718 | A1 | 6/2017 | Horsley et al. |
| 2018/0107854 | A1 | 4/2018 | Tsai et al. |
| 2018/0268796 | A1 | 9/2018 | Shelton et al. |
| 2019/0342654 | A1 | 11/2019 | Buckland et al. |

FOREIGN PATENT DOCUMENTS

| | | | |
|---|---|---|---|
| CN | 106694347 | A | 5/2017 |
| CN | 109967332 | A | 7/2019 |
| CN | 215612944 | U | 1/2022 |
| EP | 0607139 | A1 | 7/1994 |
| WO | 2017/095396 | A1 | 6/2017 |
| WO | 2018/026657 | A1 | 2/2018 |

* cited by examiner

MICRO-MACHINED ULTRASONIC TRANSDUCER INCLUDING A TUNABLE HELMOLTZ RESONATOR

BACKGROUND

Technical Field

The present disclosure generally relates to the field of microelectromechanical devices, hereinafter MEMS ("Micro Electro Mechanical System") devices. More particularly, the present disclosure relates to micro-machined ultrasonic transducers, hereinafter referred to as MUT ("Micro-machined Ultrasonic Transducer") transducers.

Description of the Related Art

A MEMS device comprises mechanical, electrical and/or electronic components integrated in highly miniaturized form on a same substrate in semiconductor material, for example silicon, by means of micromachining techniques (for example, lithography, deposition and etching).

A MUT transducer is an example of a MEMS device suitable for the transmission/reception of ultrasonic waves.

A conventional MUT transducer comprises a membrane or diaphragm element suspended in a flexible manner (typically, by means of suitable spring elements) above the substrate.

In the operation of the MUT transducer as a transmitter, the membrane element oscillates (or vibrates) about an equilibrium position thereof in response to the application of an electric signal in alternating current (AC), thereby generating ultrasonic waves.

In the operation of the MUT transducer as a receiver, the membrane element oscillates (or vibrates) about its equilibrium position as a consequence of an ultrasonic wave incident thereon, corresponding electric signals (for example, current and/or voltage electric signals) are generated.

During the generation/reception of ultrasonic waves, the membrane element oscillates, about its equilibrium position, at a respective resonance frequency.

The resonance frequency can be defined, during the design phase, on the basis of parameters such as size and materials of the membrane element.

BRIEF SUMMARY

The Applicant believes that the conventional MUT transducers are not satisfactory, in particular in applications where a plurality of (for example, two or more) MUT transducers are used so as to operate in a cooperative manner (for example, pairs of transmitter MUT transducers/receiver MUT transducers, and MUT transducer arrays).

In fact, in such applications, it is desirable that the resonance frequencies of the MUT transducers are strictly corresponding.

Although, in principle, the micromachining techniques allow making a MUT transducer with a predefined resonance frequency, inevitable process tolerances originate, in practice, variations in the properties of the membrane element (for example, thickness and residual stress), which translate into an (effective) resonance frequency different than the default resonance frequency.

These inevitable process tolerances can be found both for MUT transducers formed on the same substrate, and (even more so) for MUT transducers formed on different substrates.

The Applicant is aware of the existence of finishing techniques, such as laser-based finishing techniques ("laser trimming"), which allow adjusting operating parameters of an electronic circuit by applying targeted structural (geometric) changes to it (for example, through burn and vaporization operations). Although laser trimming techniques allow obtaining MUT transducers with accurate resonance frequencies, they utilize dedicated instruments and long processing times, which adds a significant increase in terms of production costs.

The Applicant has faced the above-mentioned issues, and has conceived a MUT transducer capable of overcoming them.

In its general terms, the MUT transducer according to various embodiments of the present disclosure comprises a membrane element and a cap structure formed above the membrane element, such that the cap structure and the membrane element, by acting as a Helmholtz resonator, allow adjusting the resonance frequency at which the membrane element oscillates according to the equilibrium position of the membrane element.

More specifically, various embodiments of the present disclosure relate to a micro-machined ultrasonic transducer.

The micro-machined ultrasonic transducer comprises a membrane element for transmitting/receiving ultrasonic waves, during the transmission/reception of ultrasonic waves the membrane element oscillating, about an equilibrium position, at a respective resonance frequency. The equilibrium position of the membrane element is variable according to a biasing electric signal applied to the membrane element.

The micro-machined ultrasonic transducer further comprises a cap structure extending above the membrane element. Said cap structure identifies, between it and said membrane element, a cavity whose volume is variable according to the equilibrium position of the membrane element. Said cap structure comprises an opening for inputting/outputting the ultrasonic waves into/from the cavity. Said cap structure and said membrane element act as tunable Helmholtz resonator, whereby said resonance frequency is variable according to the volume of the cavity.

According to an embodiment, additional or alternative to any of the preceding embodiments, the micro-machined ultrasonic transducer comprises at least one first electrode for sending/receiving an alternating current electric signal adapted to cause/detect the oscillation of the membrane element, and at least one second electrode for receiving a direct current biasing electric signal adapted to bias the membrane element in a respective equilibrium position.

According to an embodiment, additional or alternative to any of the preceding embodiments, the at least one first electrode is different from the at least one second electrode.

According to an embodiment, additional or alternative to any of the preceding embodiments, the micro-machined ultrasonic transducer further comprises a substrate of semiconductor material. Said membrane element is suspended in a flexible manner above the substrate.

According to an embodiment, additional or alternative to any of the preceding embodiments, the cap structure is made of a semiconductor material.

According to an embodiment, additional or alternative to any of the preceding embodiments, the micro-machined ultrasonic transducer is a piezoelectric micro-machined ultrasonic transducer.

According to an embodiment, additional or alternative to any of the preceding embodiments, the micro-machined ultrasonic transducer is a capacitive micro-machined ultrasonic transducer.

Another embodiment of the present disclosure relates to an electronic system comprising one or more of such micro-machined ultrasonic transducers.

A further embodiment of the present disclosure relates to a method for operating such micro-machined ultrasonic transducer.

According to an embodiment, the method comprises:

providing at least one micro-machined ultrasonic transducer, wherein the at least one micro-machined ultrasonic transducer is designed with a predefined resonance frequency, and applying a biasing electric signal to the membrane element of the at least one micro-machined ultrasonic transducer for changing the volume of the cavity thereby setting the resonance frequency at which the membrane element oscillates to a target resonance frequency.

According to an embodiment, additional or alternative to any of the preceding embodiments, the at least one micro-machined ultrasonic transducer comprises a plurality of micro-machined ultrasonic transducers designed with the same predefined resonance frequency, each micro-machined ultrasonic transducer exhibiting a respective effective resonance frequency different from the predefined resonance frequency. The method comprises:

for each micro-machined ultrasonic transducer, applying to the respective membrane element a corresponding biasing electric signal, so as to obtain the same target resonance frequency, equal to said predefined resonance frequency, for the plurality of micro-machined ultrasonic transducers.

BRIEF DESCRIPTION OF THE SEVERAL VIEWS OF THE DRAWINGS

One or more embodiments of the present disclosure, as well as further features and advantages thereof, will be better understood with reference to the following detailed description, provided by way of non-limiting example, to be read together with the attached drawings (in which corresponding elements are indicated with identical or similar references and their explanation is not repeated for the sake of brevity). In this respect, it is expressly understood that the drawings are not necessarily drawn to scale (with some details that may be exaggerated and/or simplified) and that, unless otherwise indicated, they are simply used to conceptually illustrate the described structures and procedures. In particular.

DETAILED DESCRIPTION

Figure 1:
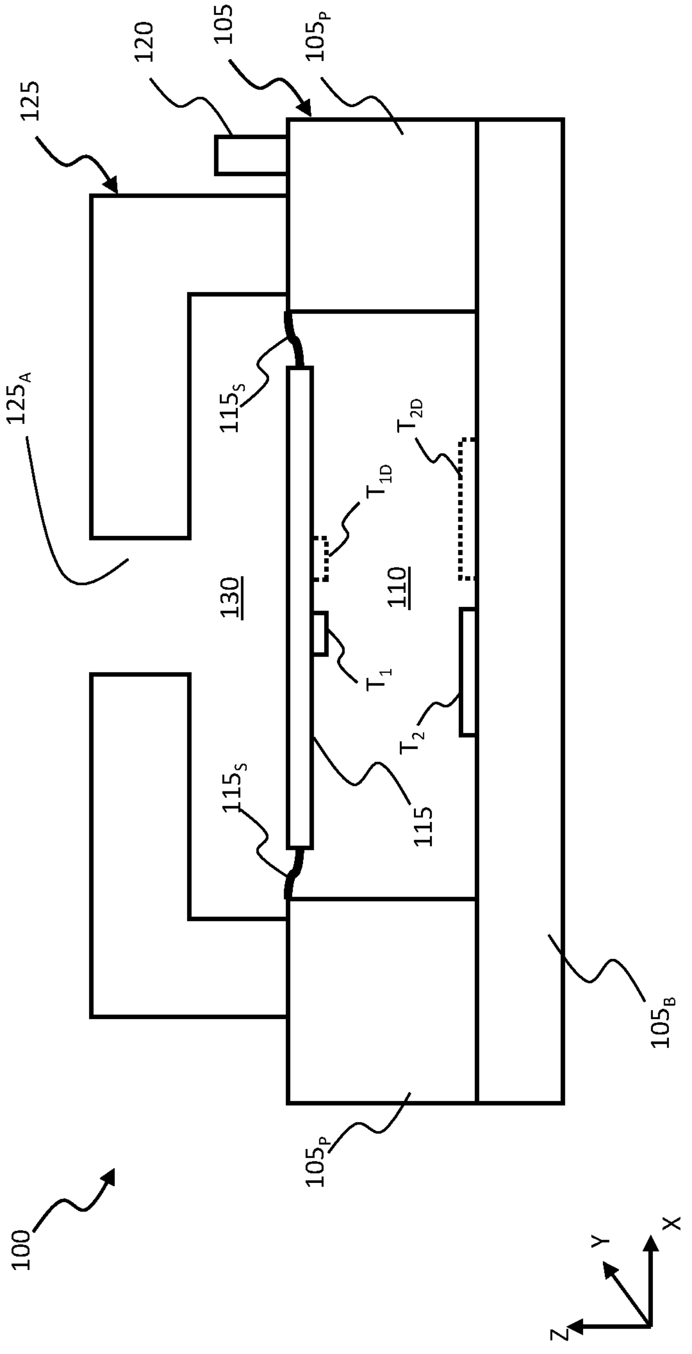
FIG. 1 schematically shows a sectional view of a MUT transducer according to an embodiment of the present disclosure.

With reference to FIG. 1, it schematically shows a sectional view of a micro-machined ultrasonic transducer (MUT) 100, hereinafter referred to as MUT transducer, according to an embodiment of the present disclosure.

In the following, when one or more features of the MUT transducer 100 are introduced by the wording "in accordance with an embodiment", they may be interpreted as functionalities additional or alternative to any functionality previously introduced, unless explicitly indicated otherwise and/unless or incompatibility among combinations of features immediately apparent to the person skilled in the art.

In the following, directional terminology (for example, upper, lower, lateral, central, longitudinal, transversal and vertical) associated with the MUT transducer 100 and components thereof will be used in connection with their orientation in the figures, and will not be indicative of any specific orientation (among the various possible) of use thereof.

In this respect, FIG. 1 shows the reference system identified by the three orthogonal directions X, Y, and Z, which in the following will be referred to as longitudinal direction X, transverse direction Y and vertical direction Z.

According to an embodiment, the MUT transducer 100 has a circular (or substantially circular) shape. According to alternative embodiments, the MUT transducer 100 has a square (or substantially square), triangular (or substantially triangular), rectangular (or substantially rectangular), hexagonal (or substantially hexagonal), or octagonal (or substantially octagonal) shape.

According to an embodiment, the MUT transducer 100 comprises a substrate 105. According to an embodiment, the substrate 105 comprises a wafer in semiconductor material (for example, silicon).

According to an embodiment, the substrate 105 has an internally hollow structure. According to an embodiment, the substrate 105 comprises a substrate bottom portion 105E and substrate perimeter portion $\mathbf{105}_P$ extending in height, i.e., along the vertical direction Z, beyond the substrate bottom portion 105B; in this way, the substrate perimeter portion $\mathbf{105}_P$ and the substrate bottom portion 105E delimit a respective cavity 110 (hereinafter, substrate cavity).

According to an embodiment, the MUT transducer 100 comprises a membrane or diaphragm element 115 suitable for the transmission/reception of acoustic waves (for example, ultrasonic waves).

According to an embodiment, the membrane element 115 is suspended in a flexible manner above the substrate 105.

According to an embodiment, the MUT transducer 100 comprises a plurality of (i.e., two or more) spring elements $\mathbf{115}_S$, each one making a respective connection between the membrane element 115 (i.e., a respective region thereof) and the substrate 105 (i.e., a respective region of the substrate perimeter portion $\mathbf{105}_P$).

In the operation of the MUT transducer 100 as a transmitter, the membrane element 115 oscillates about its equilibrium position in response to the application of an electric signal in alternating current (AC), thereby generating ultrasonic waves. In other words, in the operation of the MUT transducer 100 as a transmitter, the AC electric signal applied to the membrane element 115 acts as an AC electric signal stimulating the oscillation of the membrane element 115.

In the operation of the MUT transducer 100 as a receiver, when the membrane element 115 oscillates about its equilibrium position as a consequence of an ultrasonic wave incident on it, a corresponding AC electric signal (for example, a current and/or voltage AC electric signal) is generated (and typically acquired and/or processed by means of suitable electronic circuits, not shown, for example integrated in the MUT transducer 100). In other words, in the operation of the MUT transducer 100 as a receiver, the AC electric signal generated by the membrane element 115 acts as an AC electric signal detecting the oscillation of the membrane element 115.

According to an embodiment, during the generation/reception of the ultrasonic waves, the membrane element 115 oscillates, about its equilibrium position, at a respective resonance frequency.

The resonance frequency may be defined, at the design stage, on the basis of parameters such as sizes and materials of the membrane element 115. In any case, inevitable process tolerances originate variations in the properties of the membrane element 115 (for example, thickness and residual stress), which translate into an (effective) resonance frequency different from the resonance frequency defined in the design phase (or predefined resonance frequency).

According to an embodiment, the equilibrium position of the membrane element 115 is variable according to an electric biasing signal (for example, in direct current) applied to the membrane element 115 (for example, through one or multiple electrodes used for the application of the AC electric signal or through one or more dedicated electrodes, as discussed below). Therefore, for the purposes of the present disclosure, by equilibrium position of the membrane element 115 it is meant the position taken by the membrane element 115 due to the application of the electric biasing signal (and in the absence of application of the electric signal AC).

According to an embodiment, the MUT transducer 100 is associated with one or more electronic circuits 120 suitable for generating the electric biasing signal, such one or more electronic circuits 120 being for example included in the MUT transducer 100 or being external (and electrically coupled or connected) to it.

According to an embodiment, the MUT transducer 100 comprises one or more electronic circuits 120 suitable for generating the electric biasing signal.

According to an embodiment, the electronic circuits 120 are further adapted to generate the electric signal AC stimulating the oscillation of the membrane element 115 (in alternative embodiments, the MUT transducer 100 may comprise further electronic circuits, not shown, dedicated to it).

According to an embodiment, the electronic circuits 120 are further adapted to receive the electric signal AC detecting the oscillation of the membrane element 115 (in alternative embodiments, the MUT transducer 100 may comprise further electronic circuits, not shown, dedicated to it).

The electronic circuits 120, illustrated in the figure by means of a schematic representation in that they are per se well known, are electrically connected to one or more electrodes for the exchange of the electric signals (i.e., the biasing electric signal and/or the AC electric signal stimulating and/or detecting the AC electric signal).

According to an embodiment, the MUT transducer 100 is a capacitive MUT transducer, or CMUT transducer ("Capacitive Micro-machined Ultrasonic Transducer"). In this embodiment, the membrane element 115 may be made of an electrically insulating material, for example silicon nitride ($Si_3N_4$), or of an electrically conductive material (for example, polysilicon).

In the operation of the CMUT transducer as a transmitter, the membrane element 115 oscillates about its equilibrium position due to the modulation of the electrostatic force induced by the application of an alternating electric signal (AC) between the membrane element 115 and the substrate 105 (for example, between an electrode $T_1$ located below the membrane element 115 and an electrode $T_2$ located above the substrate bottom portion 105B, or, when the membrane element 115 is made of an electrically conductive material, between the electrode $T_2$ and the membrane element 115 acting itself as an electrode), thereby generating the ultrasonic waves. In the operation of the CMUT transducer as a receiver, when the membrane element 115 oscillates about its equilibrium position as a consequence of an ultrasonic wave incident on it, the height of the substrate cavity 110 is correspondingly modulated, and the corresponding variation in capacity can be detected and represented by electric signals (for example, current and/or voltage electric signals).

According to an alternative embodiment, the MUT transducer 100 is a piezoelectric MUT transducer, or PMUT ("Piezoelectric Micro-machined Ultrasonic Transducer") transducer. In this embodiment, a piezoelectric material layer (for example titanium lead zirconium (PZT)), not shown, may be formed above the membrane element 115, or the membrane element 115 may be made in a piezoelectric material. In the operation of the PMUT transducer as a transmitter, the membrane element 115 oscillates about its equilibrium position due to the deformation induced by the application of an AC electric signal at the ends of the membrane element 115 (for example, between an electrode (not shown) located above the piezoelectric material layer and an electrode (not shown) located below the piezoelectric material layer, or, when the membrane element 115 is made of a piezoelectric material, between an electrode (not shown) placed above the membrane element 115 and an electrode (not shown) located below the membrane element 115), thereby generating ultrasonic waves. In the operation of the PMUT transducer as a receiver, when the membrane element 115 oscillates about its equilibrium position as a consequence of an ultrasonic wave incident on it, corresponding electrical signals (for example, current and/or voltage electric signals) proportional to the deformations are generated and properly detected.

As mentioned above, according to an embodiment, the equilibrium position of the membrane element 115 is variable according to an electric bias signal applied to the membrane element 115 through the electrodes used for the application of the AC electric signal (for example, the electrodes $T_1$ and $T_2$, or the electrode $T_2$ and the membrane element 115, in the case of a CMUT transducer).

As previously mentioned, according to an embodiment, the equilibrium position of the membrane element 115 is variable according to an electric bias signal applied to the membrane element 115 through one or more dedicated electrodes.

For example, in the case of a CMUT transducer, the biasing electric signal may be applied between a dedicated electrode $T_{1D}$ located below the membrane element 115 and a dedicated electrode $T_{2D}$ located above the substrate bottom portion 105E (or, when the membrane element 115 is made of an electrically conductive material, between the dedicated electrode $T_{2D}$ and the membrane element 115 acting itself as an electrode).

For example, in the case of a PMUT transducer, the biasing electric signal may be applied between a dedicated electrode (not shown) located above the piezoelectric material layer and a dedicated electrode (not shown) located below the piezoelectric material layer (or, when the membrane element 115 is made of a piezoelectric material, between a dedicated electrode (not shown) located above the membrane element 115 and a dedicated electrode (not shown) located below the membrane element 115).

For the sake of brevity, elements deemed relevant for the understanding of the present disclosure have been introduced and described.

According to the principles of the present disclosure, the MUT transducer 100 further comprises a tunable Helmholtz resonator that, as better discussed in the following, allows tuning the resonance frequency of the ultrasonic waves transmitted and/or received by the membrane element 115.

In its classic definition, a Helmholtz resonator is a bottle with a neck very small compared to the body.

According to an embodiment, the MUT transducer 100 comprises a cap structure 125 extending, along the vertical direction Z, above the substrate 105 (for example, from the substrate perimeter portion $\mathbf{105}_P$) and the membrane element 115.

According to an embodiment, the cap structure 125 is made of, or comprises, a semiconductor material (for example, silicon).

According to an embodiment, the cap structure 125 identifies, between it and the membrane element 115, a cavity 130 (as will be apparent soon, such a cavity 130 represents the cavity of the tunable Helmholtz resonator, reason why in the following it will be referred to as resonant cavity). Since, as discussed above, the equilibrium position of the membrane element 115 is variable according to a biasing electric signal applied to the membrane element 115 (i.e., the biasing electric signal is adapted to bias the membrane element in a respective equilibrium position), the volume of the resonant cavity 130 is accordingly variable according to the equilibrium position of the membrane element 115.

According to an embodiment, the cap structure 125 comprises an opening $\mathbf{125}_A$—as will be apparent soon, the opening $\mathbf{125}_A$ represents the outlet of the resonant cavity 130 of the tunable Helmholtz resonator.

Therefore, the cap structure 125 according to the exemplary considered embodiment defines an internally hollow open cap.

According to an embodiment, the cap structure 125 may be obtained by known techniques of deposition a temporary coating layer covering the substrate perimeter portion $\mathbf{105}_P$, the membrane element 115 and the spring elements $\mathbf{115}_S$, and by known techniques of etching or selective etching of this temporary coating layer to obtain the opening $\mathbf{125}_A$ and the resonant cavity 130.

According to an embodiment, in the operation of the MUT transducer 100 as a receiver, the opening $\mathbf{125}_A$ is adapted to allow the input of the ultrasonic waves into the resonant cavity 130 (and, hence, interception thereof by the membrane element 115).

According to an embodiment, in the operation of the MUT transducer 100 as a transmitter, the opening $\mathbf{125}_A$ is adapted to allow the output of the ultrasonic waves (generated as a result of the oscillation of the membrane element 115) from the resonant cavity 130 (and, more generally, from the MUT transducer 100).

The opening $\mathbf{125}_A$ can be suitably sized according to specific design criteria. For example, parameters such as length of the opening $\mathbf{125}_A$ (i.e., extension of the opening $\mathbf{125}_A$ along the longitudinal direction X), width of the opening $\mathbf{125}_A$ (i.e., extension of the opening $\mathbf{125}_A$ along the transverse direction Y) and height of the opening $\mathbf{125}_A$ (i.e., extension of the opening $\mathbf{125}_A$ along the vertical direction Z) may be chosen according to the length, width and/or height of the resonant cavity 130 and/or of the membrane element 115.

Particularly, in order that the cap structure 125 and the membrane element 115 may act as a Helmholtz resonator, the opening $\mathbf{125}_A$ has to be sized in such a way that the volume of the opening $\mathbf{125}_A$ (equal to the product between length, width and height of the opening $\mathbf{125}_A$) is much lower than the volume of the resonant cavity.

In the exemplary, not limiting, illustrated embodiment, the opening $\mathbf{125}_A$ is located, along the longitudinal direction X, substantially centrally with respect to the membrane element 115.

According to an embodiment, the cap structure 125 and the membrane element 115 act as a tunable Helmholtz resonator, whereby the resonance frequency at which the membrane element 115 oscillates is variable according to the (variable) volume of the resonant cavity 130.

Particularly, according to the principles of the Helmholtz resonator, the resonance frequency ω of the MUT transducer 100 may be expressed as follows:

$$\omega = v\sqrt{\frac{A}{V*L}}$$

wherein A is the area of the opening $\mathbf{125}_A$ (i.e., the product between the length of the opening $\mathbf{125}_A$ and the width of the opening $\mathbf{125}_A$), L is the height of the opening $\mathbf{125}_A$, V is the volume of the resonant cavity 130, and v is the speed of the ultrasonic waves in air.

As mentioned above, in order that the cap structure 125 and the membrane element 115 may act as an Helmholtz resonator, the volume V of the cavity 130 has to be much higher (for example, from 10 to 1000 times) the volume of the opening $\mathbf{125}_A$ (i.e., A*L).

Figure 2:
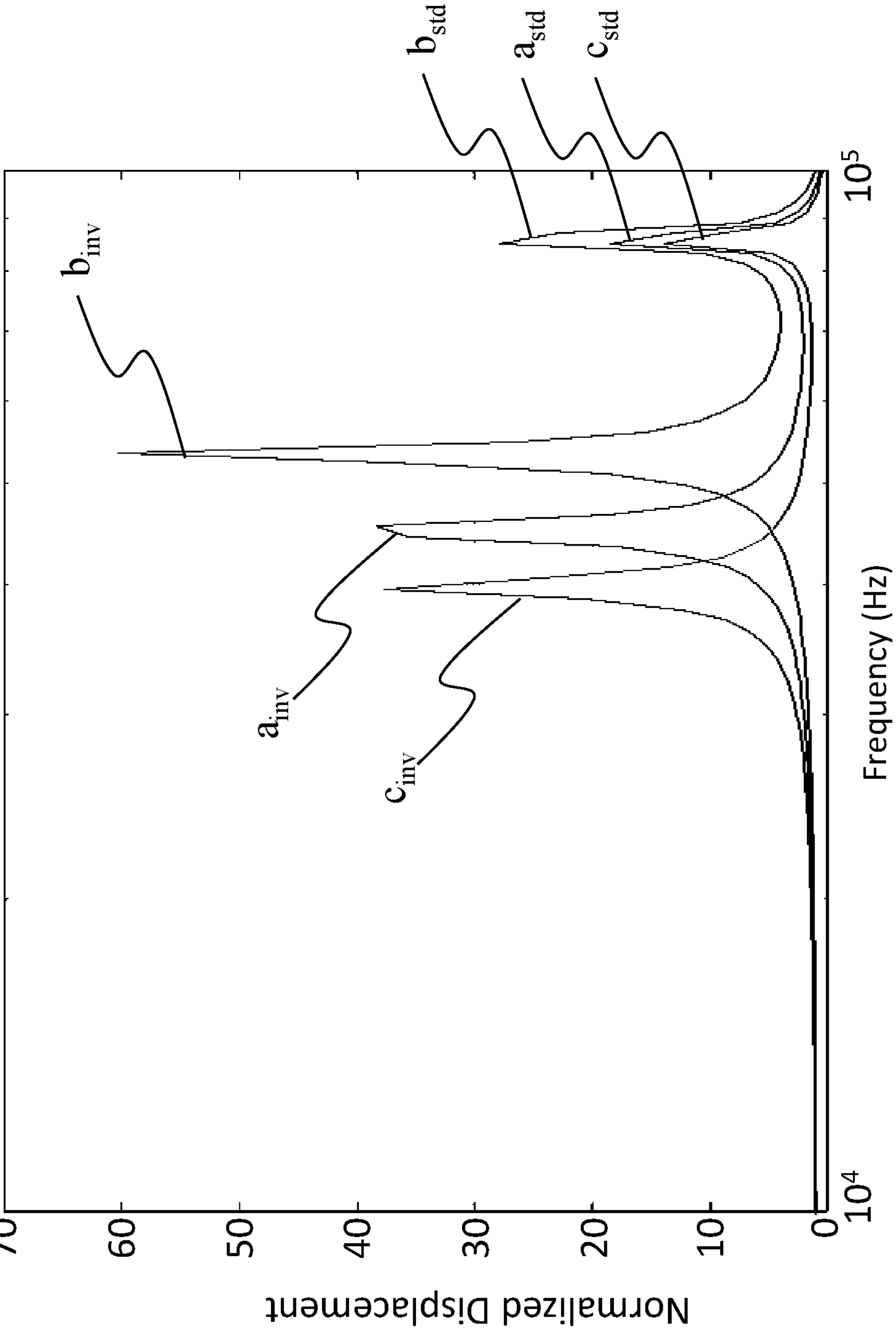
FIG. 2 is a graph illustrating the trend of the resonance frequency of the MUT transducer of FIG. 1 according to an embodiment of the present disclosure.

With reference now to FIG. 2, it shows a graph illustrating the trend of the resonance frequency of the MUT transducer 100 as the equilibrium position of the membrane element 115 changes. More particularly, this figure shows, on the right, the trend of the resonance frequency having a mechanical origin (hereinafter, mechanical resonance frequency), which would similarly be present in a conventional MUT transducer (i.e., a MUT transducer without a cap structure capable of forming a tunable Helmholtz resonator) and, at the center, the trend of the resonance frequency having an acoustic origin (hereinafter, acoustic resonance frequency) due to the presence of the tunable Helmholtz resonator according to various embodiments of the present disclosure.

The values of resonance frequency shown in the graph were obtained by the Applicant using numerical modeling and simulation techniques, using a membrane element having a length of 1 mm, a height of 15 μm and a resonance frequency of 75 kHz, a number of spring elements equal to 4, and a cap structure having a height equal to 220 μm, a height of the resonant cavity equal to 70 μm, and a width of the opening equal to 350 μm.

As mentioned above, the values of resonance frequency shown in the graph were obtained by varying the equilibrium position of the membrane element. In particular, the values of resonance frequency values shown in the graph were obtained in three different equilibrium positions of the membrane element, and specifically in an equilibrium position resulting from the absence of a biasing electric signal (hereinafter, equilibrium position without offset), in an equilibrium position resulting from the application of a biasing electric signal corresponding to a movement of the membrane element in a position raised by 20 μm with respect to the equilibrium position without offset (hereinafter, equilibrium position with positive offset), and in an equilibrium position resulting from the application of a biasing electric signal corresponding to a movement of the membrane element in a position lowered by 20 μm with respect to the equilibrium position without offset (hereinafter referred to as the equilibrium position with negative offset).

As visible in FIG. 2, the value of the mechanic resonance frequency (i.e., of the MUT transducer without the cap structure adapted to form a tunable Helmholtz resonator and, analogously, of a conventional MUT transducer having same dimensioning of the membrane element and of the spring elements) is equal to 75 kHz regardless of the equilibrium position of the membrane element, i.e., with the membrane element in the equilibrium position without offset (curve "$a_{std}$"), with the membrane element in the equilibrium position with positive offset (curve "$b_{std}$") and with the membrane element in the equilibrium position with negative offset (curve "$c_{std}$").

As visible in FIG. 2, the acoustic resonance frequency (i.e., of the MUT transducer provided with the cap structure adapted to form a tunable Helmholtz resonator according to various embodiments of the present disclosure) takes different values depending on the equilibrium position of the membrane element, and equal to 45 kHz when the membrane element is in the equilibrium position without offset (curve "$a_{inv}$"), equal to 53.5 kHz when the membrane element is in the equilibrium position with positive offset (curve "$b_{inv}$"), and equal to 39.6 kHz when the membrane element is in the equilibrium position with negative offset (curve "$c_{inv}$").

Therefore, the resonance frequency of the MUT transducer according to various embodiments of the present disclosure can be adjusted over a wide range of resonance frequencies, so as to compensate for alterations of the predefined resonance frequency as a consequence of the inevitable process tolerances.

In this regard, a method of operating this MUT transducer according to various embodiments of the present disclosure comprises applying a biasing electric signal to the membrane element of the MUT transducer to vary the volume of the cavity, thereby setting the resonance frequency at which the membrane element oscillates at a target resonance frequency different from the predefined resonance frequency.

According to an embodiment, the target resonance frequency is the same predefined resonance frequency; in this embodiment, the MUT transducer and the relative operating method according to various embodiments of the present disclosure may be used to restore the predefined resonance frequency (which, due to the inevitable process tolerances, may have undergone unpredictable alterations).

The MUT transducer according to various embodiments of the present disclosure may also be used in applications providing a plurality of distinct MUT transducers adapted to operate in a cooperative manner, which generally have particularly stringent characteristics of uniformity of resonance frequency.

According to an embodiment, when a plurality of (for example, two or more) MUT transducers designed with the same predefined resonance frequency are provided, with each MUT transducer that exhibits a respective effective resonance frequency different from the predefined resonance frequency, the method according to an embodiment of the present disclosure comprises, for each MUT transducer, applying a corresponding (and different) biasing electric signal to the respective membrane element (thereby varying the volume of the respective resonant cavity), so as to restore the same predefined resonance frequency for the plurality of MUT transducers.

According to an embodiment, when a plurality of (for example, two or more) MUT transducers designed with a respective predefined resonance frequency are provided, the method according to an embodiment of the present disclosure comprises, for each MUT transducer, applying a corresponding (and different) biasing electric signal to the respective membrane element, so as to obtain the same target resonance frequency for the plurality of MUT transducers.

According to this embodiment, the target resonance frequency is different from the predefined resonance frequency; in fact, in this embodiment, the MUT transducer and the relative operating method are used to equalize a plurality of different (and differently designed and/or produced) MUT transducers at the same target resonance frequency.

The regulation of the resonance frequency of the MUT transducer according to various embodiments of the present disclosure (in order to compensate for alterations of the predefined resonance frequency and/or in order to equalize a plurality of MUT transducers suitable to operate in a cooperative manner at the same resonance frequency) is obtained in a simple and effective way, i.e., without using finishing techniques (such as laser-based finishing techniques, or "laser trimming" techniques) that utilize dedicated instruments and long processing times.

Figure 3:
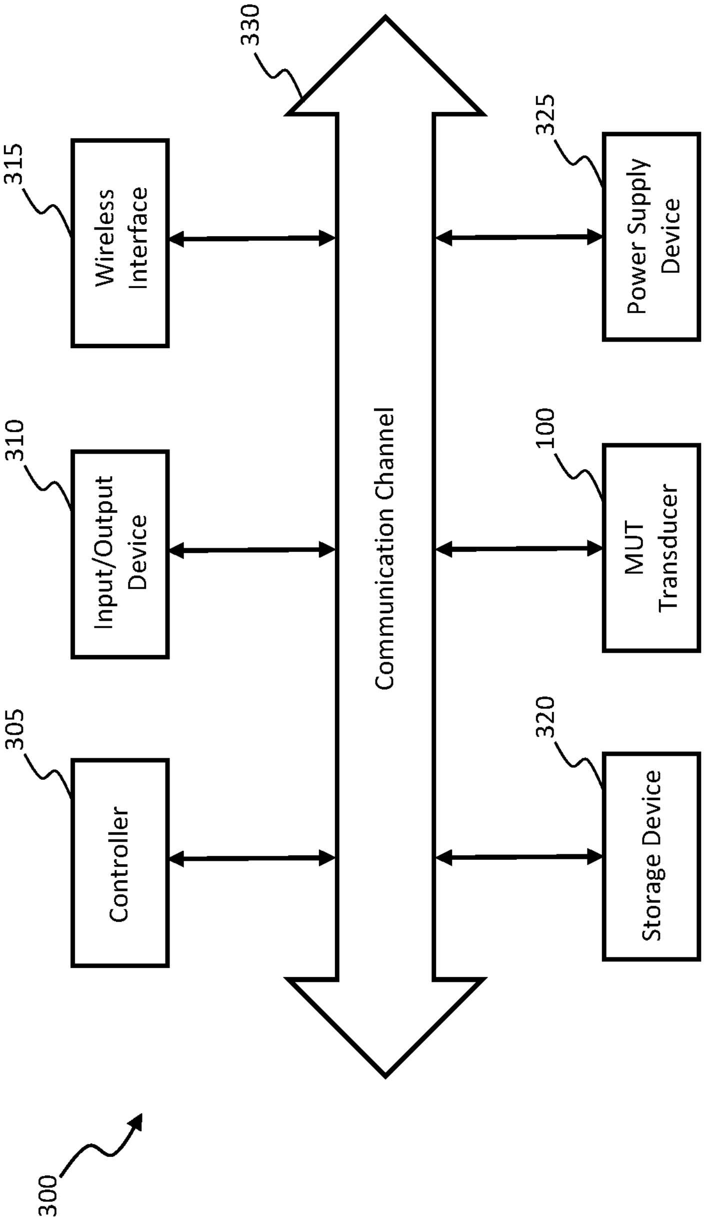
FIG. 3 shows a simplified block diagram of an electronic system comprising the MUT transducer of FIG. 1 according to an embodiment of the present disclosure.

Referring now to FIG. 3, it shows a simplified block diagram of an electronic system 300 (i.e., a portion thereof) comprising the MUT transducer 100 (or more thereof) according to an embodiment of the present disclosure.

According to an embodiment, the electronic system 300 is suitable for use in electronic devices such as handheld computers (PDAs, "Personal Digital Assistants"), laptop or portable computers, and mobile phones (for example, smartphones).

According to an embodiment, the electronic system 300 comprises, in addition to the MUT transducer 100, a controller 305 (for example, one or more microprocessors and/or one or more microcontrollers). The controller 305 may for example be used to control the MUT transducer 100.

According to an embodiment, the electronic system 300 comprises, additionally or alternatively to the controller 305, an input/output device 310 (for example, a keyboard and/or a screen). The input/output device 310 may for example be used to generate and/or receive messages. The input/output device 310 may for example be configured to receive/supply a digital signal and/or an analog signal.

According to an embodiment, the electronic system 300 comprises, additionally or alternatively to the controller 305 and/or to the input/output device 310, a wireless interface 315 for exchanging messages with a wireless communication network (not shown), for example by means of radio frequency signals. Examples of a wireless interface may include antennas and wireless transceivers.

According to an embodiment, the electronic system 300 comprises, additionally or alternatively to the controller 305 and/or to the input/output device 310 and/or to the wireless interface 315, a storage device 320 (for example, a volatile or non-volatile memory).

According to an embodiment, the electronic system 300 comprises, additionally or alternatively to the controller 305 and/or to the input/output device 310 and/or to the wireless interface 315, and/or to the storage device 320, a power supply device (for example, a battery 325) for powering the electronic system 300.

According to an embodiment, the electronic system 300 comprises one more communication channels (bus) 330 to allow the exchange of data between the MUT transducer 100, the controller 305 (when provided), the input/output device 310 (when provided), the wireless interface 315 (when provided), the storage device 320 (when provided) and the power supply device 325 (when provided).

Naturally, in order to satisfy contingent and specific needs, a person skilled in the art may apply many logical and/or physical modifications and variations to the various embodiments of the present disclosure. More specifically, although the various embodiments of the present disclosure have been described with a certain degree of particularity with reference to one or more of embodiments thereof, it should be understood that various omissions, substitutions and changes in the form and details, as well as other embodiments are possible.

In particular, different embodiments of the present disclosure may even be practiced without the specific details (such as the numerical examples) set forth in the previous description to provide a more thorough understanding thereof; on the contrary, well-known features may have been omitted or simplified in order not to obscure the description with unnecessary details. Furthermore, it is expressly understood that specific elements and/or method steps described in connection with any disclosed embodiment of the present disclosure may be incorporated in any other embodiment such as a normal design choice. In any case, ordinal or other qualifiers are used merely as labels to distinguish elements with the same name but do not connote for themselves any priority, precedence or order. Furthermore, the terms include, understand, have, contain and imply (and any form thereof) should be understood with an open and non-exhaustive meaning (i.e., not limited to the elements recited), the terms based on, dependent on, according to, function of (and any form thereof) should be understood with a non-exclusive relationship (that is, with any further variables involved) and the term an should be understood as one or more elements (unless otherwise indicated).

In particular, similar considerations apply if the MUT transducer (or the electronic system comprising one more of these MUT transducers) has a different structure or includes equivalent components. In any case, any components thereof may be separated into several elements, or two or more components may be combined into a single element; in addition, each component may be replicated to support the execution of the corresponding operations in parallel. It should also be noted that (unless otherwise indicated) any interaction between different components generally does not need to be continuous, and may be both direct and indirect through one or more intermediaries.

More specifically, the various embodiments of the present disclosure lends itself to be implemented through an equivalent method (by using similar steps, removing some steps being not essential, or adding further optional steps); moreover, the steps may be performed in different order, concurrently or in an interleaved way (at least partly).

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A micro-machined ultrasonic transducer, comprising:

a membrane element configured to transmit or receive ultrasonic waves, wherein, during transmission or reception of ultrasonic waves, the membrane element oscillates, about an equilibrium position, at a resonance frequency, wherein the equilibrium position of the membrane element is variable according to a biasing electric signal applied to the membrane element; and a cap structure overlying the membrane element, wherein the cap structure forms a cavity between the cap structure and the membrane element, wherein a volume of the cavity is variable according to the equilibrium position of the membrane element, wherein the cap structure includes an opening configured to input or output the ultrasonic waves into or from the cavity, wherein the cap structure and the membrane element act as tunable Helmholtz resonator in which the resonance frequency is variable according to the volume of the cavity.

2. The micro-machined ultrasonic transducer according to claim 1, further comprising:

at least one first electrode configured to send or receive an alternating current electric signal adapted to cause or detect the oscillation of the membrane element; and at least one second electrode configured to receive a direct current biasing electric signal adapted to bias the membrane element in the equilibrium position.

3. The micro-machined ultrasonic transducer according to claim 2, wherein the at least one first electrode is different from the at least one second electrode.

4. The micro-machined ultrasonic transducer according to claim 1, further comprising:

a substrate of semiconductor material, wherein the membrane element is suspended in a flexible manner over the substrate.

5. The micro-machined ultrasonic transducer according to claim 1, wherein the cap structure is made of a semiconductor material.

6. The micro-machined ultrasonic transducer according to claim 1, wherein the micro-machined ultrasonic transducer is a piezoelectric micro-machined ultrasonic transducer.

7. The micro-machined ultrasonic transducer according to claim 1, wherein the micro-machined ultrasonic transducer is a capacitive micro-machined ultrasonic transducer.

8. An electronic system, comprising:

at least one micro-machined ultrasonic transducer, each of the at least one micro-machined ultrasonic transducer including:

a membrane element configured to transmit or receive ultrasonic waves, wherein, during transmission or reception of ultrasonic waves, the membrane element oscillates, about an equilibrium position, at a resonance frequency, wherein the equilibrium position of the membrane element is variable according to a biasing electric signal applied to the membrane element; and a cap structure overlying the membrane element, wherein the cap structure forms a cavity between the cap structure and the membrane element, wherein a volume of the cavity is variable according to the equilibrium position of the membrane element, wherein the cap structure includes an opening configured to input or output the ultrasonic waves into or from the cavity, wherein the cap structure and the membrane element act as tunable Helmholtz resonator in which the resonance frequency is variable according to the volume of the cavity.

9. The electronic system according to claim 8, wherein each of the at least one micro-machined ultrasonic transducer includes:

at least one first electrode configured to send or receive an alternating current electric signal adapted to cause or detect the oscillation of the membrane element; and at least one second electrode configured to receive a direct current biasing electric signal adapted to bias the membrane element in the equilibrium position.

10. The electronic system according to claim 8, wherein each of the at least one micro-machined ultrasonic transducer includes:

a substrate of semiconductor material, wherein the membrane element is suspended in a flexible manner over the substrate.

11. The electronic system according to claim 8, wherein each of the at least one micro-machined ultrasonic transducer is a piezoelectric micro-machined ultrasonic transducer.

12. The electronic system according to claim 8, wherein each of the at least one micro-machined ultrasonic transducer is a capacitive micro-machined ultrasonic transducer.

13. The electronic system according to claim 8, wherein the cap structure is made of a semiconductor material.

14. A method, comprising:

forming at least one micro-machined ultrasonic transducer, wherein the at least one micro-machined ultrasonic transducer is designed with a predefined resonance frequency, wherein the forming of the at least one micro-machined ultrasonic transducer includes:

forming a membrane element on a substrate, wherein the membrane element is suspended in a flexible manner over the substrate, wherein the membrane element is configured to transmit or receive ultrasonic waves, wherein, during transmission or reception of ultrasonic waves, the membrane element oscillates, about an equilibrium position, at a resonance frequency, wherein the equilibrium position of the membrane element is variable according to a biasing electric signal applied to the membrane element; and forming a cap structure that overlies the membrane element, wherein the cap structure forms a cavity between the cap structure and the membrane element, wherein a volume of the cavity is variable according to the equilibrium position of the membrane element, wherein the cap structure includes an opening configured to input or output the ultrasonic waves into or from the cavity, wherein the cap structure and the membrane element act as tunable Helmholtz resonator in which the resonance frequency is variable according to the volume of the cavity; and applying the biasing electric signal to the membrane element of the at least one micro-machined ultrasonic transducer to change the volume of the cavity and thereby setting the resonance frequency at which the membrane element oscillates to a target resonance frequency.

15. The method according to claim 14, wherein the at least one micro-machined ultrasonic transducer includes a plurality of micro-machined ultrasonic transducers designed with the predefined resonance frequency, and each of the plurality of micro-machined ultrasonic transducers exhibit a respective effective resonance frequency different from the predefined resonance frequency, the method comprising:

for each of the plurality of micro-machined ultrasonic transducers, applying, to the respective membrane element, a corresponding biasing electric signal so as to obtain the target resonance frequency, the target resonance frequency being equal to the predefined resonance frequency.

16. The method according to claim 14, wherein the forming of the at least one micro-machined ultrasonic transducer includes:

forming at least one first electrode configured to send or receive an alternating current electric signal adapted to cause or detect the oscillation of the membrane element; and forming at least one second electrode configured to receive a direct current biasing electric signal adapted to bias the membrane element in the equilibrium position.

17. The method according to claim 16, wherein the at least one first electrode is different from the at least one second electrode.

18. The method according to claim 14, wherein the cap structure is made of a semiconductor material.

19. The method according to claim 14, wherein each of the at least one micro-machined ultrasonic transducer is a piezoelectric micro-machined ultrasonic transducer.

20. The method according to claim 14, wherein each of the at least one micro-machined ultrasonic transducer is a capacitive micro-machined ultrasonic transducer.

* * * * *